United States Patent [19]

Fischer

[11] Patent Number: 5,230,595
[45] Date of Patent: Jul. 27, 1993

[54] EXPANSIBLE PLASTIC FIXING PLUG

[75] Inventor: Artur Fischer, Waldachtal, Fed. Rep. of Germany

[73] Assignee: fischerwerke Artur Fischer GmbH & Co. KG, Waldachtal, Fed. Rep. of Germany

[21] Appl. No.: 881,510

[22] Filed: May 12, 1992

[30] Foreign Application Priority Data

May 29, 1991 [DE] Fed. Rep. of Germany ....... 4117503

[51] Int. Cl.$^5$ .................... F16B 13/06; F16B 19/00
[52] U.S. Cl. ........................ 411/60; 411/55; 411/508
[58] Field of Search ............ 411/32, 33, 55, 60, 411/61, 508, 913

[56] References Cited

U.S. PATENT DOCUMENTS

| | | |
|---|---|---|
| 3,171,321 | 3/1965 | Fischer ........................ 411/60 |
| 3,323,404 | 6/1967 | Fischer et al. ................. 411/60 |

FOREIGN PATENT DOCUMENTS

| | | |
|---|---|---|
| 1097117 | 1/1961 | Fed. Rep. of Germany . |
| 7047990 | 12/1970 | Fed. Rep. of Germany . |
| 7436655 | 10/1974 | Fed. Rep. of Germany . |
| 2432211 | 1/1976 | Fed. Rep. of Germany . |
| 2760081 | 1/1978 | Fed. Rep. of Germany . |
| 3048654 | 7/1982 | Fed. Rep. of Germany . |
| 6408465 | 1/1965 | Netherlands ................ 411/60 |
| 421620 | 4/1967 | Switzerland ................. 411/60 |

Primary Examiner—Neill R. Wilson
Attorney, Agent, or Firm—Michael J. Striker

[57] ABSTRACT

The expansible plastic fixing plug consists of a plastic body provided with a slot beginning at the front end of the body and extending longitudinally over a portion of the length of the body in a plane passing longitudinally through the body. The plastic body is provided with a longitudinal bore starting from the rear end for insertion of a fixing screw having an outer diameter. The longitudinal bore has a cylindrical portion having an inner diameter corresponding approximately to the outer diameter of the fixing screw and a narrowing portion ending at the slot. To reduce the insertion resistance for the fixing screw the narrowing portion narrows in a direction at right angles to the plane in which the slot extends and has a width in the plane along its length approximately equal to the inner diameter of the cylindrical portion.

4 Claims, 1 Drawing Sheet

EXPANSIBLE PLASTIC FIXING PLUG

BACKGROUND OF THE INVENTION

The invention relates to an expansible plastic fixing plug having a slot extending for a part of its length and a longitudinal bore for insertion of a fixing screw or similar means.

A known expansible plastic fixing plug has a plastic body with a slot starting at its front end and extending for a part of its length, the slot being in the form of a split between two halves of the body in the front region of the plug. The expansible plastic fixing plug has a longitudinal bore starting from the rear end of the fixing plug for insertion of a fixing screw or similar means. This bore has a cylindrical portion and following it a narrowing portion which terminates at the slot.

German Patent 1 097 117 discloses a cylindrical expansible plastic fixing plug which is slotted for a part of its length, the rear end of which has a longitudinal bore for the insertion of a fixing screw. The first portion of this longitudinal bore is cylindrical in form and has an inner diameter corresponding approximately to the outer diameter of the fixing screw. The first portion of this longitudinal bore is cylindrical in form and has a diameter corresponding approximately to the outer diameter of the fixing screw. Adjoining this cylindrical portion there is a conically tapering or narrowing portion, which terminates in the slot of the fixing plug formed by a split in the front region of the plug. The conical taper of the longitudinal bore of the fixing plug provides a circular cross-sectional narrowing which presents a high insertion resistance as the fixing screw is screwed in. Although the expansible segments of the fixing plug formed by the longitudinal slot are to yield at right angles to the plane of the slot to reduce the insertion resistance, in the plane of the slot the thread of the fixing screw must nevertheless cut fully into the material of the fixing plug. Because the fixing plug is unable to expand in the plane of the slot, this increased insertion resistance is not converted into corresponding expansion force. Because of the increased insertion resistance it is possible, particularly in the case of drilled holes that have turned out to be too big, for the fixing plug to turn with the fixing screw as this is screwed in, despite antirotation ribs arranged on the outer circumference of the plug.

SUMMARY OF THE INVENTION

It is an object of the present invention to provide an expansible fixing plug of the type described above so that the insertion resistance is reduced without reduction in the holding value and the rotation of the fixing plug with the fixing screw during installation is prevented.

This object and others which will be made more apparent hereinafter is attained in an expansible plastic fixing plug consisting of a longitudinally extending plastic body having a slot starting at its front end and extending in a plane passing through the plastic body along a part of its length, the slot being in the form of a split between opposing front halves in the front region of the plug. The expansible plastic fixing plug has a longitudinal bore starting from the rear end of the fixing plug for insertion of a fixing screw or similar means. This longitudinal bore has a cylindrical portion and following and communicating with it a narrowing portion which terminates at the slot.

According to the invention, the narrowing portion narrows only in a direction at right angles to the plane in, which the slot extends and has a noncircular cross-section having a width in the plane passing through the slot approximately equal to the inner diameter of the cylindrical portion.

Because the narrowing of the longitudinal bore is occurs only in one plane, which is perpendicular to the plane of the slot, and the inner diameter of the cylindrical portion of the longitudinal bore is approximately equal to the width of the narrowing portion so that the transverse cross-section of the narrowing portion is not circular, the thread of the fixing screw has to cut only into the two opposite wall surfaces of the narrowing portion and/or the opposing front halves. This results in a reduction in the insertion resistance without any reduction in the holding value for the fixing plug. By virtue of the slot extending as far as the cylindrical portion of the longitudinal bore in a preferred embodiment, the two expansible segments or halves are able to start spreading apart in the vicinity of the narrowing portion, so that the resulting insertion resistance is converted directly into expansion force. The fact that the fixing plug starts to expand at this point reinforces the antirotation action. In this manner, the rotation resistance of the fixing plug is improved owing to the reduced insertion resistance.

To make it easier for the fixing screw to cut into the fixing plug, the longitudinal bore has inner ribs running parallel to the longitudinal axis of the bore and extending through the cylindrical and the narrowing portion. Optimum conditions, and in particular a satisfactory guidance of the fixing screw, is achieved if the cylindrical portion of the longitudinal bore, as well as the narrowing pcrtion, each extend for a third of the length of the fixing plug. It is advantageous for the slot starting from the front end of the fixing plug to extend approximately as far as the cylindrical portion of the longitudinal bore.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figures 1, 2:
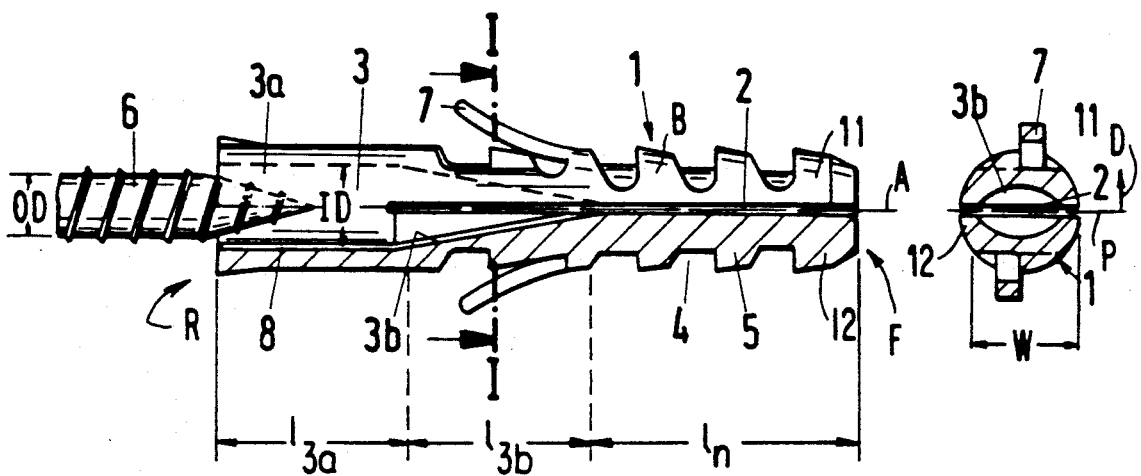
FIG. 1 is a partially longitudinal cross-sectional view through an expansible fixing plug according to the invention.
FIG. 2 is a transverse cross-sectional view across the expansible fixing plug of FIG. 1 taken along the section line I—I of FIG. 1.
Figure 3:
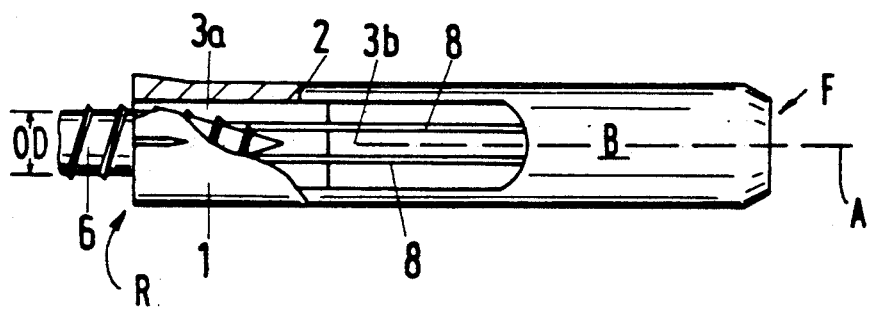
FIG. 3 is a partially cutaway side view of the expansible fixing plug of FIG. 1.

The expansible fixing plug 1 consists of a plastic body B provided with a slot 2 that begins at its front end F and extends in the longitudinal direction as far as a cylindrical portion 3a of the longitudinal bore 3. The cylindrical outer surface of the plastic body B is provided with several notches 4. Teeth 5 of the body B are thereby formed which dig into soft material as the fixing plug is expanded and in hard building materials produce corresponding frictional force at the wall of the drilled hole as a result of undergoing plastic deformation.

Adjoining the cylindrical portion 3a of the longitudinal bore 3 of the plug there is a narrowing portion 3b which terminates in the slot 2 forming a split in the front region 11, 12. The longitudinal bore 3 has a longitudinal axis A. The narrowing portion 3b opens only in a direction D at right angles to a plane P in which the slot 2 extends so that in the plane P of the slot 2 the inner diameter ID of the cylindrical portion 3a of the longitudinal bore 3 is preserved. The width W of the slot 2 is thus approximately equal to the inner diameter ID of the cylindrical portion 3a along the slot 2. The inner diameter ID of the cylindrical portion 3a corresponds approximately to the outer diameter OD of the fixing screw 6. As the fixing screw 6 is screwed in, it is guided initially in the cylindrical portion 3a of the longitudinal bore 3. As it penetrates the narrowing portion 3b, expansion of the plastic body B starts. Maximum expansion force is achieved as the fixing screw 6 is screwed into the split between the two front halves 11 and 12 formed by the slot 2 in the front region F. To prevent the fixing plug 1 from rotating with the fixing screw, two projecting blocking tongues 7 are located at the outer circumference of the plastic body B.

So that it is easier for the fixing screw 6 to cut in the inside of the plastic body B, the longitudinal bore 3 of the expansible fixing plug 1 has inner longitudinal ribs 8, which extend along the cylindrical portion 3a parallel to the longitudinal axis A of the bore 3 and over the entire length of the narrowing portion 3b as well as the cylindrical portion 3a.

Optimum guidance of the screw is obtained when the length $l_{3a}$ of the cylindrical portion 3a and the length $l_{3b}$ of the narrowing portion 3b each extend over ⅓ of the total length, $l_{3a}+l_{3b}+l_r$, of the fixing element.

While the invention has been illustrated and described as embodied in an expansible plastic fixing plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. Expansible plastic fixing plugs consisting of a longitudinally extending plastic body having a front end, a rear end and a length, said plastic body being provided with a slot beginning at the front end and extending in a plane passing through the plastic body along a portion of the length of the body, said slot being formed by a split between opposing front halves of the plug body, and the plastic body being provided with a longitudinal bore having a longitudinal axis and starting from the rear end for insertion of a fixing screw having an outer diameter, the longitudinal bore having a cylindrical portion having an inner diameter corresponding approximately to the outer diameter of the fixing screw and a narrowing portion narrowing to the slot, wherein the narrowing portion narrows only in a direction at right angles to the plane in which the slot extends and has a noncircular cross-section having a width in the plane in which the slot extends approximately equal to the inner diameter of the cylindrical portion.

2. An expansible plastic fixing plug as defined in claim 1, wherein the cylindrical portion of the longitudinal bore is provided with inner longitudinal ribs extending parallel to the axis of the longitudinal bore and extending through the cylindrical portion and the narrowing portion.

3. An expansible plastic fixing plug as defined in claim 1, wherein the cylindrical portion of the longitudinal bore and the narrowing portion of the longitudinal bore each extend over a third of the length of the plastic body.

4. An expansible plastic fixing plug as defined in claim 1, wherein the slot extends up to the cylindrical portion of the longitudinal bore through the narrowing portion.

* * * * *